(12) United States Patent
Kang

(10) Patent No.: US 11,648,888 B2
(45) Date of Patent: May 16, 2023

(54) SURROUND VIEW MONITORING SYSTEM AND PROVIDING METHOD OF THE SAME

(71) Applicant: HYUNDAI MOBIS CO., LTD., Seoul (KR)

(72) Inventor: Tae Hoon Kang, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/497,869

(22) Filed: Oct. 8, 2021

(65) Prior Publication Data
US 2022/0118916 A1    Apr. 21, 2022

(30) Foreign Application Priority Data
Oct. 20, 2020 (KR) .................. 10-2020-0136213

(51) Int. Cl.
*B60R 11/04* (2006.01)
*B60K 35/00* (2006.01)
*B60R 11/00* (2006.01)

(52) U.S. Cl.
CPC .............. *B60R 11/04* (2013.01); *B60K 35/00* (2013.01); *B60K 2370/176* (2019.05); *B60K 2370/179* (2019.05); *B60K 2370/188* (2019.05); *B60R 2011/004* (2013.01); *B60R 2300/102* (2013.01); *B60R 2300/103* (2013.01); *B60R 2300/105* (2013.01); *B60R 2300/303* (2013.01); *B60R 2300/8093* (2013.01)

(58) Field of Classification Search
None
See application file for complete search history.

(56) References Cited

U.S. PATENT DOCUMENTS

| | | | |
|---|---|---|---|
| 2018/0027179 A1* | 1/2018 | Matsuzaki | H04N 5/23238 348/38 |
| 2019/0116315 A1* | 4/2019 | Satomi | H04N 5/23238 |
| 2020/0226817 A1* | 7/2020 | Pankey | G06V 20/58 |
| 2022/0042286 A1* | 2/2022 | Tsuji | G06F 3/147 |
| 2022/0297605 A1* | 9/2022 | Ewald | B60R 11/04 |

FOREIGN PATENT DOCUMENTS

KR    10-2017-0124232    11/2017

* cited by examiner

*Primary Examiner* — Rebecca A Volentine
(74) *Attorney, Agent, or Firm* — DLA Piper LLP (US)

(57) ABSTRACT

A surround view monitoring system and a method for providing the same, including a plurality of registration cameras, each mounted on a vehicle and photographing different areas around the vehicle; a depth camera that acquires distance information with respect to an obstacle existing around the vehicle; an image synthesis unit that generates a synthesis image by synthesizing images photographed by the plurality of registration cameras, and displays the distance information with respect to the obstacle acquired by the depth camera on an obstacle existing in the synthesis image; and an image control unit that displays the synthesized synthesis image on a display device are disclosed.

13 Claims, 8 Drawing Sheets

SURROUND VIEW MONITORING SYSTEM AND PROVIDING METHOD OF THE SAME

CROSS REFERENCE TO RELATED APPLICATION

The present application claims priority to Korean Patent Application No. 10-2020-0136213, filed Oct. 20, 2020, the entire contents of which is incorporated herein for all purposes by this reference.

BACKGROUND OF THE INVENTION

Field of the Invention

The present invention relates to a surround view monitoring system and a method for providing the same, and more particularly, to a technology for providing a surround view displaying distance information with respect to an obstacle.

Description of the Related Art

In recent years, the use of a front registration camera, a rear registration camera, and a side view registration camera has been spreading in vehicles. These registration cameras are often used to assist drivers and can improve vehicle stability.

In particular, a Surround View Monitoring (SVM) system that includes a plurality of registration cameras installed in a vehicle to display a 360-degree omnidirectional image around the vehicle has been developed and commercialized.

The SVM system combines the images around the vehicle photographed by the registration cameras provided at each location of the vehicle and provides the SVM image in the form of a Top View image as if a driver is looking at the vehicle from the sky, thereby providing the effects of displaying obstacles around the vehicle and eliminating blind spots.

However, although a conventional SVM system displays a surrounding image on a display device so that a driver can determine the distance to the obstacle, there is a problem in that it is difficult to determine the distance due to distortion caused by registering a plurality of images.

In particular, in the case of the front and rear of the vehicle, assistance through a short-range ultrasonic sensor is possible, but in the case of the side, there is a problem in that it is difficult to determine distance information with respect to the obstacle.

The matters described as the background art above are only for improving the understanding of the background of the present invention, and should not be taken as acknowledging that they correspond to the prior art already known to those of ordinary skill in the art.

SUMMARY OF THE INVENTION

The present invention has been proposed to solve this problem, and an object of the present invention is to provide a surround view monitoring (SVM) system for displaying distance information with respect to an obstacle a displayed surround view and a method for providing the same.

In order to achieve the above purpose, the surround view monitoring system according to the present invention includes a plurality of registration cameras, each mounted on a vehicle and photographing different areas around the vehicle; a depth camera that acquires distance information with respect to an obstacle existing around the vehicle; an image synthesis unit that generates a synthesis image by synthesizing images photographed by the plurality of registration cameras, and displays the distance information with respect to the obstacle acquired by the depth camera on an obstacle existing in the synthesis image; and an image control unit that displays the synthesized synthesis image on a display device.

The plurality of registration cameras may include a first camera for photographing a front of the vehicle; a second camera for photographing a rear of the vehicle; a third camera for photographing a left side of the vehicle; and a fourth camera for photographing a right side of the vehicle.

The depth camera may sense a distance with respect to the obstacle existing around the vehicle by transmitting and receiving infrared ray around the vehicle.

The depth camera may be provided in plurality, and each depth camera may acquire the distance information with respect to the obstacle located in front, rear and both sides of the vehicle.

A plurality of the depth cameras may be disposed to be spaced apart in left and right directions at a front end and a rear end of the vehicle, or a plurality of the depth cameras may be disposed to be spaced apart in front and rear directions at side ends of the vehicle.

The image synthesis unit may display the distance information with respect to the obstacle by illustrating the obstacle in a preset color for each distance spaced apart from the vehicle in the synthesis image.

The image control unit may detect an obstacle having a distance spaced apart from the vehicle equal to or less than a preset distance in the synthesis image, and simultaneously display the synthesis image and an enlarged image in which an area including the detected obstacle in the synthesis image is enlarged on the display device.

When a plurality of obstacles having a distance spaced apart from the vehicle equal to or less than the preset distance is detected in the synthesis image, the image control unit may divide and display the plurality of enlarged images each including the detected obstacle on the display device.

The image control unit may detect an obstacle positioned from the vehicle at a distance equal to or less than a preset distance in the synthesis image, and simultaneously display an image including an adjacent obstacle among images photographed by the plurality of registration cameras and the synthesis image on the display device.

The image control unit may detect an obstacle having the shortest distance spaced apart from the vehicle in the synthesis image, and simultaneously display an enlarged image in which an area including the detected obstacle is enlarged and the synthesis image on the display device.

In order to achieve the above purpose, the method for providing a surround view according to the present invention includes the steps of: photographing different areas around a vehicle with a plurality of registration cameras, respectively; acquiring distance information with respect to an obstacle existing around the vehicle with a depth camera; generating a synthesis image by synthesizing images photographed by a plurality of registration cameras, and displaying the distance information with respect to the obstacle acquired by the depth camera on an obstacle existing in the synthesis image; and displaying the synthesized synthesis image on a display device.

In the step of acquiring the distance information with respect to the obstacle, the distance with respect to the obstacle existing around the vehicle may be sensed by transmitting and receiving infrared ray around the vehicle.

In the step of generating the synthesis image and displaying the distance information, the distance information with respect to the obstacle may be displayed by illustrating the obstacle in a preset color for each distance spaced apart from the vehicle in the synthesis image.

The method may further include, before the step of displaying the synthesis image on the display device, the step of detecting an obstacle having a distance spaced apart from the vehicle equal to or less than a preset distance in the synthesis image. In the step of displaying the synthesis image on the display device, an enlarged image in which an area including the obstacle detected in the synthesis image is enlarged and the synthesis image may be simultaneously displayed on the display device.

In the step of displaying the synthesis image on the display device, when in the step of detecting the obstacle, a plurality of obstacles having the distance spaced apart from the vehicle equal to or less than the preset distance is detected in the synthesis image, a plurality of the enlarged images each including the detected obstacle may be divided and displayed on the display device.

The method may further include, before the step of displaying the synthesis image on the display device, the step of detecting an obstacle having a distance spaced apart from the vehicle equal to or less than a preset distance in the synthesis image. In the step of displaying the synthesis image on the display device, an image including an adjacent obstacle among images photographed by the plurality of registration cameras and the synthesis image may be simultaneously displayed on the display device.

The method may further include, before the step of displaying the synthesis image on the display device, the step of detecting an obstacle having the shortest distance spaced apart from the vehicle in the synthesis image. In the step of displaying the synthesis image on the display device, an enlarged image in which an area including the detected obstacle in the synthesis image is enlarged and the synthesis image may be simultaneously displayed on the display device.

According to the surround view monitoring system and the method for providing the same of the present invention, distance information with respect to an obstacle is displayed on a surround view provided to a driver, thereby enabling the driver to intuitively recognize the distance with respect to the obstacle.

DETAILED DESCRIPTION OF THE INVENTION

Figure 1:
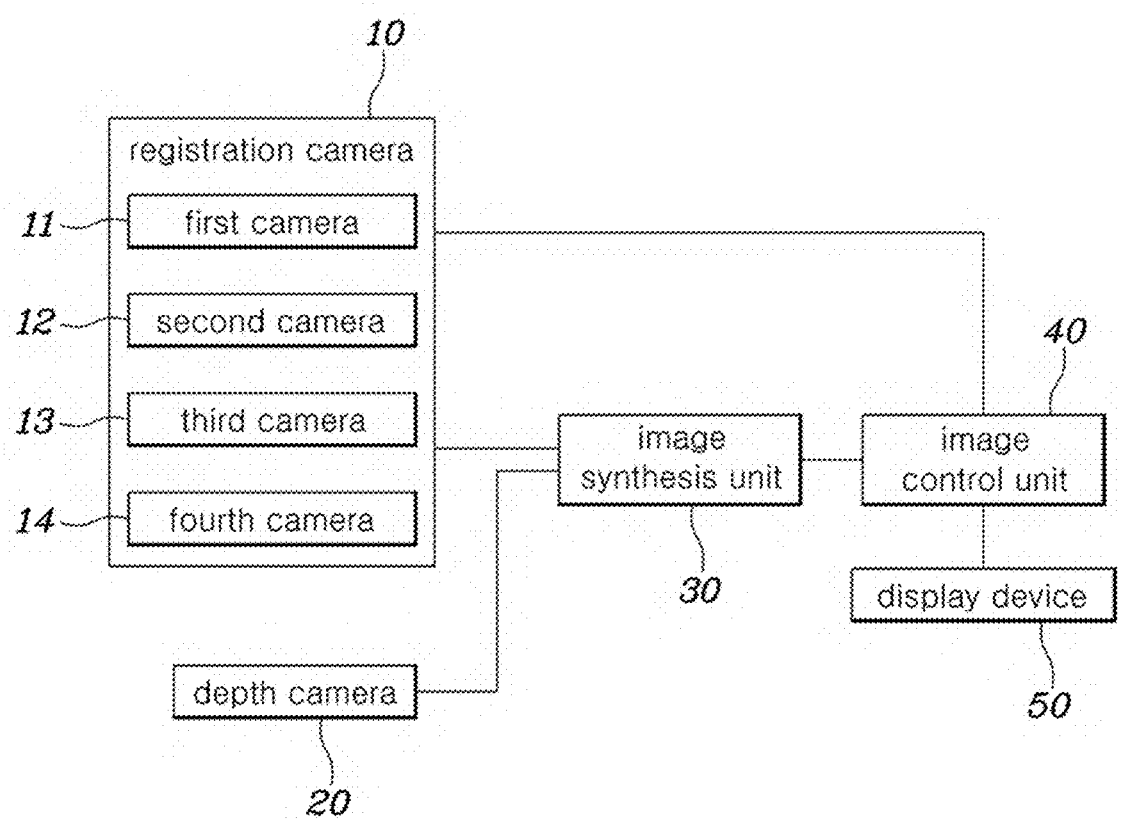
FIG. 1 is a block diagram of a surround view monitoring system according to an embodiment of the present invention.

Specific structural or functional descriptions of the embodiments of the present invention disclosed in the present specification or application are only exemplified for the purpose of describing the embodiments according to the present invention, and the embodiments according to the present invention are implemented in various forms and should not be construed as being limited to the embodiments described in the present specification or application.

Since the embodiment according to the present invention may have various changes and forms, specific embodiments will be illustrated in the drawings and described in detail in the present specification or application. However, this is not intended to limit the embodiment according to the concept of the present invention with respect to a specific disclosed form, and should be understood to include all changes, equivalents or substitutes included in the spirit and scope of the present invention.

Terms such as first and/or second may be used to describe various elements, but the elements should not be limited by the terms. The above terms are used only for the purpose of distinguishing one element from another element, for example, without departing from the scope of the present invention, a first element may be termed a second element, and similarly the second component may also be referred to as the first component.

When a component is referred to as being "connected" or "contacted" to another component, it may be directly connected or contacted to another component, but it is understood that another component may exist in between. On the other hand, when it is said that a certain element is "directly connected" or "directly contacted" to another element, it should be understood that another element does not exist in the middle. Other expressions describing the relationship between elements, such as "between" and "immediately between" or "adjacent to" and "directly adjacent to", etc., should be interpreted similarly.

The terms used herein are used only to describe specific embodiments, and are not intended to limit the present invention. The singular expression includes the plural expression unless the context clearly dictates otherwise. In this specification, terms such as "comprise" or "have" are intended to designate that an embodied feature, number, step, operation, component, part, or combination thereof exists, and it should be understood that it does not preclude in advance the possibility of the existence or addition of one or more other features or numbers, steps, operations, components, parts, or combinations thereof.

Unless defined otherwise, all terms used herein, including technical and scientific terms, have the same meaning as commonly understood by one of ordinary skill in the art to which this invention belongs. Terms such as those defined in commonly used dictionaries should be interpreted as meanings consistent with the context of the related art, and unless explicitly defined in the present specification, they are not to be interpreted in an ideal or excessively formal meaning.

Hereinafter, the present invention will be described in detail by describing preferred embodiments of the present invention with reference to the accompanying drawings. Like reference numerals in each figure indicate like elements.

FIG. 1 is a block diagram of a surround view monitoring system according to an embodiment of the present invention.

Referring to FIG. 1, a surround view monitoring system according to an embodiment of the present invention includes a plurality of registration cameras 10 each mounted on a vehicle V and photographing different areas around the vehicle V; a depth camera 20 that acquires distance information with respect to an obstacle existing around the vehicle V; an image synthesis unit 30 that generates a synthesis image S by synthesizing images photographed by the plurality of registration cameras 10, and displays distance information with respect to the obstacles acquired by the depth camera 20 on an obstacle existing in the synthesis image S; and an image control unit 40 that displays the synthesized synthesis image S on a display device 50.

The image synthesis unit 30 and the image control unit 40 according to an exemplary embodiment of the present invention may be implemented by an algorithm configured to control the operations of various components of the vehicle V, a non-volatile memory (not shown) configured to store data relating to software instructions for reproducing the algorithm, and a processor (not shown) configured to perform the operations described below using the data stored in the memory. Here, the memory and the processor may be implemented as separate chips. Alternatively, the memory and processor may be implemented as a single chip integrated with each other. A processor may take the form of one or more processors.

A plurality of registration cameras 10 each photographs the surroundings of the vehicle V, and the image synthesis unit 30 may generate a synthesis image S by synthesizing each image photographed by the plurality of registration cameras 10.

In one embodiment, the image synthesis unit 30 may generate the synthesis image S that simultaneously displays the front, rear, left and right sides of the vehicle V while looking down at the vehicle V from the top.

The depth camera 20 is a time of flight (TOF) camera, and may acquire distance information with respect to an obstacle existing around the vehicle V. Specifically, the depth camera 20 may acquire the TOF of a signal by transmitting and receiving the signal around the vehicle V. The depth camera 20 may acquire the distance information with respect to the obstacle from the TOF of the signal.

The image synthesis unit 30 may display the distance information with respect to the obstacle acquired by the depth camera 20 on the obstacle existing in the synthesis image S obtained by synthesizing the images respectively photographed by the plurality of registration cameras 10.

In particular, the image synthesis unit 30 may visualize and display the distance information with respect to the obstacle acquired by the depth camera 20 on the synthesis image S.

The image control unit 40 may display the synthesis image S synthesized by the image synthesis unit 30 on the display device 50. Here, the display device 50 may be an audio, video, navigation (AVN) screen, a Head Up Display (HUD) screen, a cluster screen and the like.

According to the present invention, by displaying the distance information with respect to the obstacle on the surround view provided to the driver, the driver can intuitively recognize the distance with respect to the obstacle.

Specifically, the plurality of registration cameras 10 may include a first camera 11 for photographing the front of the vehicle V, a second camera 12 for photographing the rear of the vehicle V, a third camera 13 for photographing the left side of the vehicle V and a fourth camera 14 for photographing the right side of the vehicle V.

The plurality of cameras may be mounted on the vehicle V to photograph the front, left, right, and rear of the vehicle V, respectively. In particular, the plurality of cameras may be respectively located in the front, left, right, and rear of the vehicle V to photograph the surroundings of the vehicle V, respectively. The images photographed by the cameras adjacent to each other may partially overlap each other.

The image synthesis unit 30 may synthesize the synthesis image S representing the surround view by synthesizing images respectively photographed by a plurality of cameras. In addition, the image synthesis unit 30 may set a synthesis boundary for synthesizing images photographed by adjacent cameras within an overlapping area where the images photographed by a plurality of cameras overlap, and synthesize the synthesis image S according to a synthesis boundary in an area where some of the images photographed by a plurality of cameras overlap each other.

Figure 2:
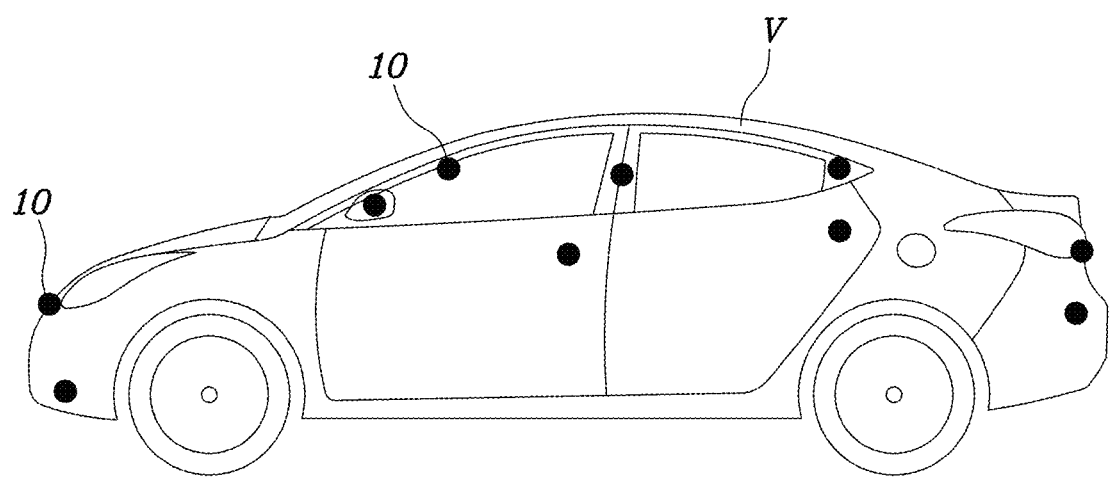
FIGS. 2 to 3 illustrate a side view and a top view of a vehicle in which a plurality of registration cameras and a depth camera are installed according to an embodiment of the present invention, respectively.
Figure 3:
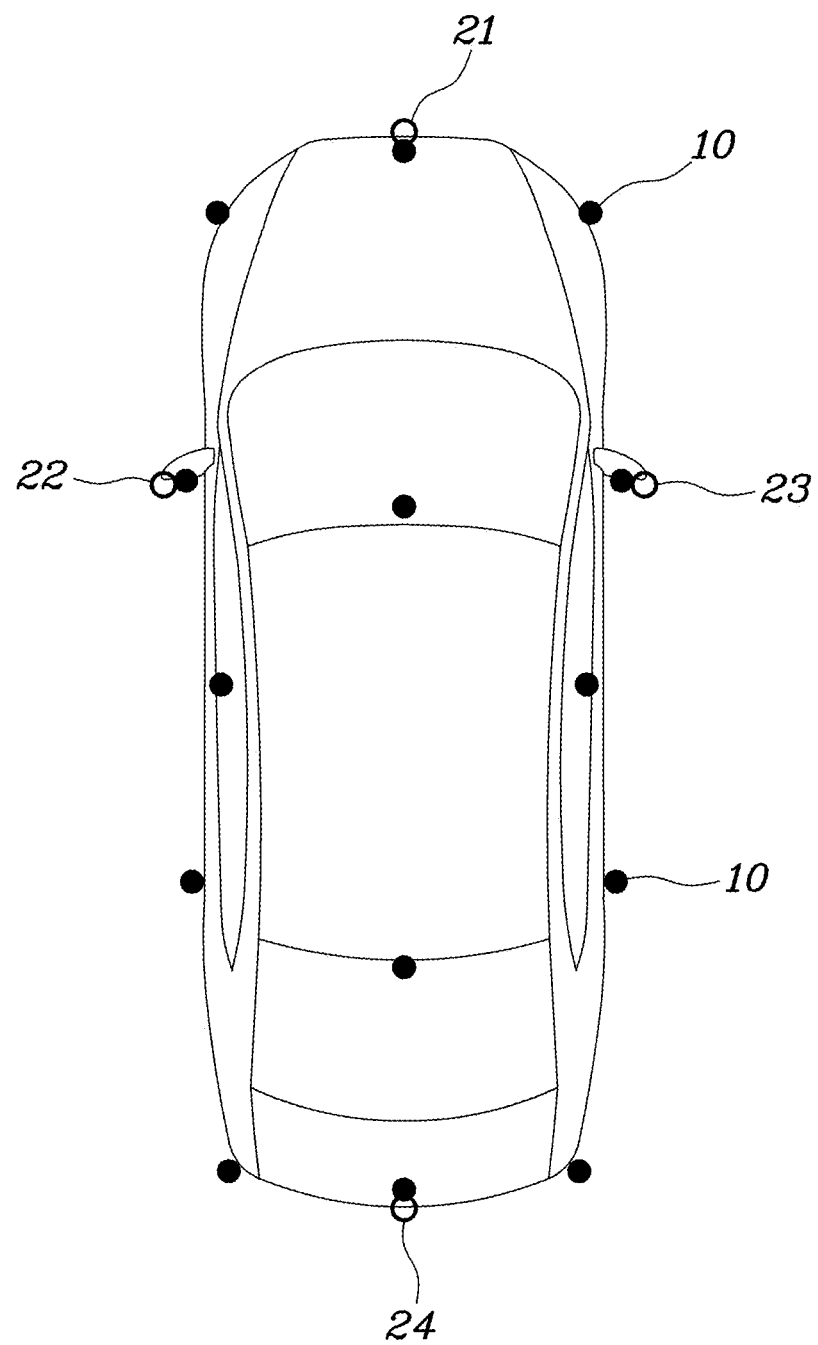

FIGS. 2 to 3 illustrate a side view and a top view of the vehicle V in which a plurality of registration cameras 10 and a depth camera 20 are installed according to an embodiment of the present invention, respectively.

Referring further to FIGS. 2 to 3, the first camera 11 is located at the front of the vehicle V, the second camera 12 is located at the rear of the vehicle V, and the third camera 13 is located on the left side of the vehicle V, and the fourth camera 14 may be located on the right side of the vehicle V.

The depth camera 20 may sense a distance with respect to an obstacle existing around the vehicle V by transmitting and receiving infrared (IR) around the vehicle V.

In one embodiment, the depth camera 20 emits a pulse-modulated infrared (IR) beam from an origin of a sphere coordinate system to a target to scan horizontally (pan, $\varphi$) and vertically (tilt, $\theta$). The TOF is the time to return to the origin after being reflected by back scattering that occurs in the point-wise distribution of different discrete points (r, $\theta$, $\varphi$) on the sphere surface.

The depth camera 20 may be a three-dimensional (r, $\theta$, $\varphi$) imaging using electronic eyes of a grid array in which the number of IR detectors varies according to the number of pixels in order to convert these infrared pulses into electronic signals.

The depth camera 20 according to an embodiment of the present invention is provided in plurality, each of which can acquire distance information with respect to the obstacle located in front, rear and both sides of the vehicle V.

In one embodiment, the depth camera 20 may be located at a location corresponding to the plurality of registration cameras 10 to acquire the distance information with the obstacles located in the front, rear, left and right sides of the vehicle V, respectively.

In another embodiment, the plurality of depth cameras 20 may be disposed to be spaced apart in the left and right directions at the front end and rear end of the vehicle V, or the plurality of depth cameras 20 may be disposed to be spaced apart in the front and rear directions at the side ends of the vehicle V.

That is, the plurality of depth cameras 20 may be disposed to be spaced apart from each other in the left and right directions and the front and rear directions of the vehicle V.

More specifically, the depth camera 20 may be installed in A pillar, B pillar, C pillar, both side mirrors, front and rear bumpers, grills, garnishes, back panels, repeaters, front and rear windshields, door handles and the like.

FIGS. 4 to 7 illustrate screens displayed on the display device 50 according to various embodiments of the present disclosure.

Referring further to FIGS. 4 to 7, the image synthesis unit 30 may display the distance information with respect to the obstacle by illustrating the obstacle in the synthesis image S in a preset color for each distance spaced apart from the vehicle V.

As one embodiment, a color may be preset for each distance spaced apart from the vehicle V. For example, a red color may be set when the distance spaced apart from the vehicle V is in a very close range (10 cm to 1 m), a yellow color may be set when the distance is in a relatively close range (1 m to 2 m), and a green color may be set when the distance is in a medium range (2 m to 3 m), a light blue color is set when the distance is in a relatively distant range (3 m to 4 m), a blue color may be set when the distance is in a very spaced range (4 m to 10 m).

Also, in another embodiment, the color, brightness, saturation, and the like may be set to continuously vary as the distance spaced from the vehicle V is changed.

Accordingly, the obstacle located in the synthesis image S may be illustrated in a preset color, so that the distance spaced apart from the vehicle V can be intuitively displayed to the driver.

In one embodiment, the image control unit 40 may detect in the synthesis image S an obstacle having a distance spaced apart from the vehicle V equal to or less than a preset distance, and simultaneously display on the display device 50 an enlarged image E that enlarges the area including the obstacle detected in the synthesis image S and the synthesis image S.

Figure 4:
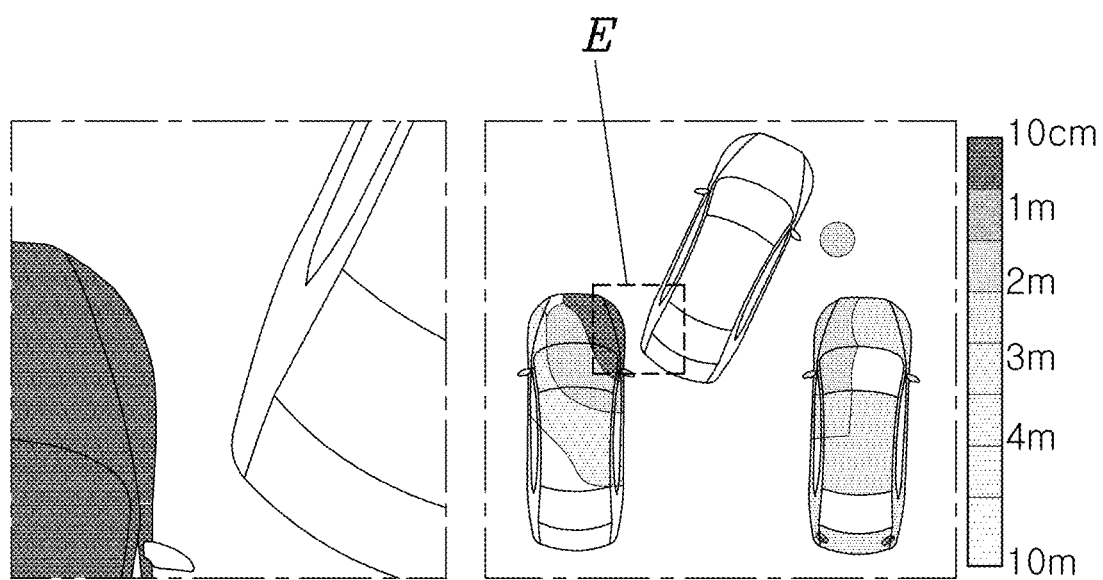
FIGS. 4 to 7 illustrate screens displayed on a display device according to various embodiments of the present invention.

In particular, as shown in FIG. 4, the display device 50 may be divided such that the enlarged image E and the synthesis image S may be simultaneously displayed on the display device 50.

Here, the enlarged image E is an enlarged image of an area including the obstacle having the distance spaced apart from the vehicle V equal to or less than a preset distance, and a part of the vehicle V and the obstacle may be simultaneously enlarged and displayed.

The distance at which the obstacle is spaced apart from the vehicle V may be detected from the distance information obtained from the depth camera 20. Also, here, the preset distance may be set to, for example, 1 m.

When a plurality of obstacles having a distance spaced apart from the vehicle V equal to or less than a preset distance is detected in the synthesis image S, the image control unit 40 may divide the display device 50 and display a plurality of enlarged images E each including the detected obstacle on the device 50.

Figure 5:
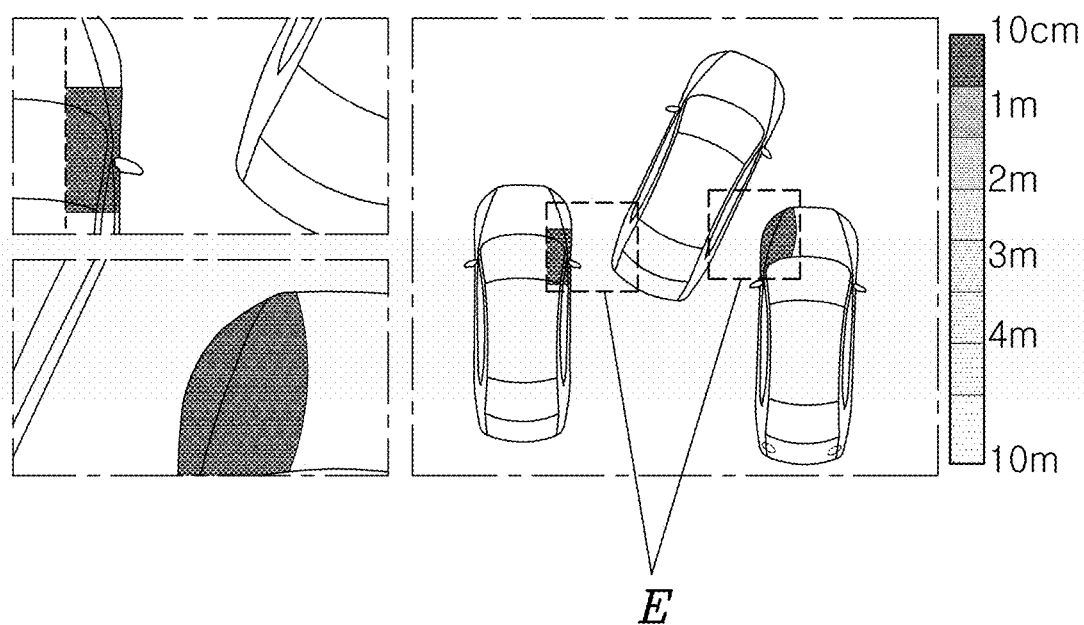

In particular, as shown in FIG. 5, when there is a plurality of obstacles with a distance spaced apart from the vehicle V equal to or less than a preset distance, the display device 50 may be divided and the plurality of enlarged images E may be displayed on the display device 50.

For example, if there are two obstacles having a distance spaced apart from the vehicle V equal to or less than a preset distance, the display area of the display device 50 may be divided in the vertical direction or the left and right directions to display two enlarged images E. In addition, when there are three obstacles, the enlarged images E are arranged in a triangle, and when there are four obstacles, the display area of the display device 50 may be divided into quarters to display the enlarged images E.

In another embodiment, the image control unit 40 may detect the obstacle positioned from the vehicle V at a distance equal to or less than a preset distance in the synthesis image S, and simultaneously display an image including an adjacent obstacle among images photographed by the plurality of registration cameras 10 and the synthesis image S on the display device 50.

Figure 6:
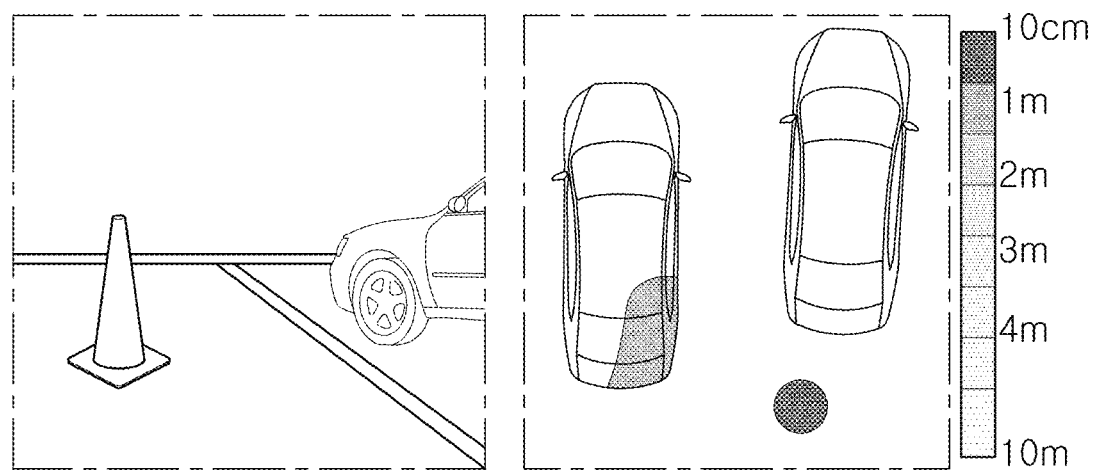

In particular, as shown in FIG. 6, the image including the detected obstacle among the images photographed by the plurality of registration cameras 10 may be displayed simultaneously with the synthesis image S.

For example, when the detected obstacle is located at the rear of the vehicle V, the image photographed by the second camera 12 for photographing the rear of the vehicle V may be displayed simultaneously with the synthesis image S.

In addition, when the obstacle exists in an area where the photographing areas of the plurality of registration cameras 10 overlap each other, the image control unit 40 may divide and display the image including the obstacle.

In another embodiment, when the obstacle is simultaneously displayed on the front image or the rear image and the left image or the right image, the image control unit 40 may display the left image or the right image. Accordingly, the obstacle may be continuously displayed on the display device 50 even if the vehicle moves forward or backward.

In another embodiment, the image control unit 40 may detect the obstacle having the shortest distance spaced apart from the vehicle V in the synthesis image S, and simultaneously display an enlarged image E in which the area including the detected obstacle is enlarged and the synthesis image S on the display device 50.

Figure 7:
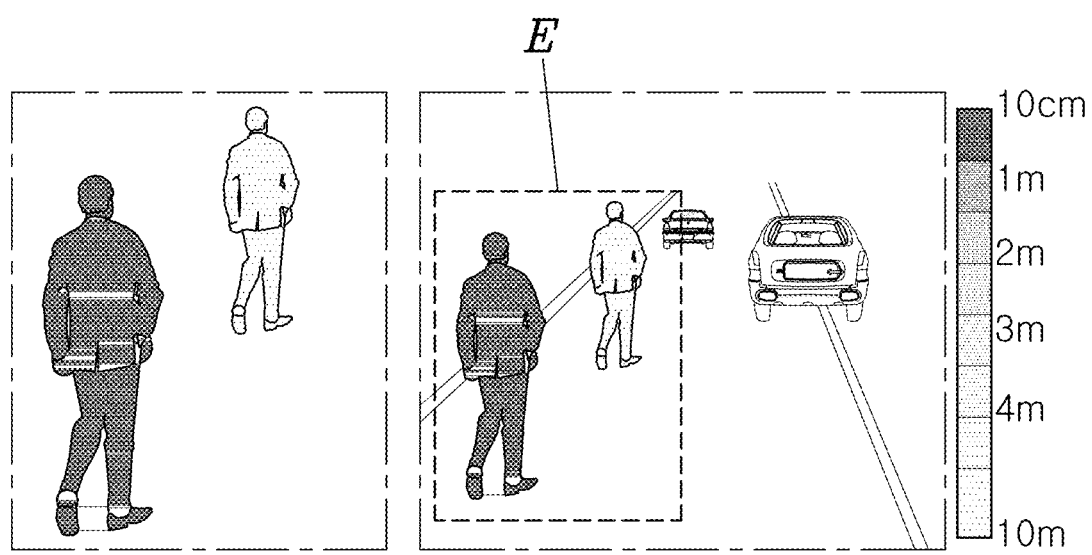

In particular, as shown in FIG. 7, the enlarged image E in which the obstacle with the shortest distance spaced apart from the vehicle V in the synthesis image S is enlarged may be on the display device 50 simultaneously with the synthesis image S.

That is, the image synthesis unit 30 may detect a plurality of obstacles in the synthesis image S, and detect an obstacle having the shortest spaced distance from the distance information on the plurality of obstacles. The image control unit 40 may display the enlarged image E that enlarges and shows the detected obstacle with the shortest spaced distance and a part of the vehicle V on the display device.

Figure 8:
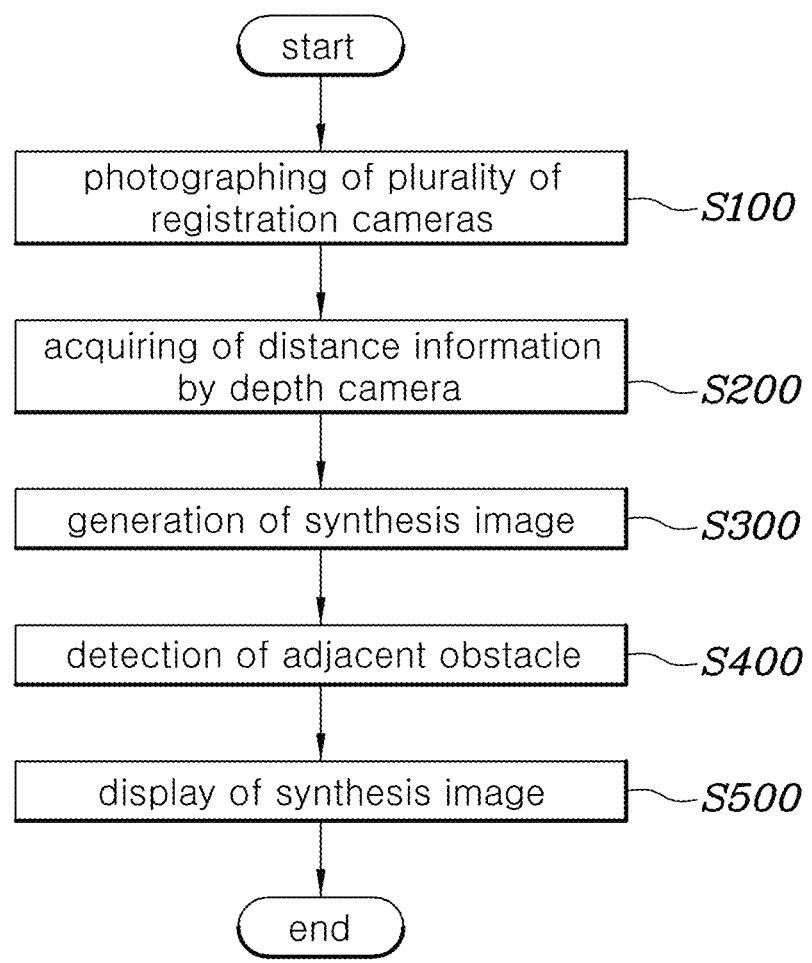
FIG. 8 is a flowchart of a method for providing a surround view according to an embodiment of the present invention.

FIG. 8 is a flowchart of a method for providing a surround view according to an embodiment of the present invention.

Referring further to FIG. 8, a method for providing a surround view according to an embodiment of the present invention includes the steps of photographing different areas around a vehicle V with a plurality of registration cameras 10, respectively (S100); acquiring distance information with respect to an obstacle existing around the vehicle V with the depth camera 20 (S200); generating a synthesis image S that displays the distance information with respect to the obstacle acquired by the depth camera 20 on an obstacle existing in the image photographed by the plurality of registration cameras 10 (S300); and displaying the synthesized synthesis image S on the display device 50 (S500).

In the step of acquiring the distance information with respect to the obstacle (S200), the distance with respect to the obstacle existing around the vehicle V may be sensed by transmitting and receiving infrared rays around the vehicle V.

In the step of generating the synthesis image S (S300), the distance information with respect to the obstacle may be displayed by illustrating the obstacle in a preset color for each distance spaced apart from the vehicle V in the synthesis image S.

Before the step of displaying the synthesis image S on the display device 50 (S500), the method may further include the step of detecting an obstacle having a distance spaced apart from the vehicle V equal to or less than a preset distance in the synthesis image S (S400). In the step of displaying the synthesis image S on the display device 50 (S500), the enlarged image E in which the area including the obstacle detected in the synthesis image S is enlarged and the synthesis image S may be simultaneously displayed on the display device 50.

In the step of displaying the synthesis image S on the display device 50 (S500), when in the step of detecting the obstacle, a plurality of obstacles with the distance spaced apart from the vehicle V equal to or less than the preset distance is detected in the synthesis image S, the plurality of enlarged images E each including the detected obstacle may be divided and displayed on the display device 50.

Before the step of displaying the synthesis image S on the display device 50 (S500), the method may further include the step of detecting an obstacle having a distance spaced apart from the vehicle V equal to or less than the preset distance in the synthesis image S (S400). In the step of displaying the synthesis image S on the display device 50 (S500), the image including the adjacent obstacle among the images photographed by the plurality of registration cameras 10 and the synthesis image S may be simultaneously displayed on the display device 50.

Before the step of displaying the synthesis image S on the display device 50 (S500), the method may further include the step of detecting an obstacle having the shortest distance spaced apart from the vehicle V in the synthesis image S (S400). In the step of displaying the synthesis image S on the display device 50, the enlarged image E in which the area including the detected obstacle in the synthesis image S is enlarged and the synthesis image S may be simultaneously displayed on the display device 50.

Although shown and described with respect to specific embodiments of the present invention, it will be apparent to those of ordinary skill in the art that the present invention can be variously improved and changed without departing from the spirit of the present invention provided by the following claims.

What is claimed is:

1. A surround view monitoring system comprising:
   a plurality of registration cameras, each mounted on a vehicle and photographing different areas around the vehicle;
   a depth camera that acquires distance information with respect to an obstacle existing around the vehicle;
   an image synthesis unit that generates a synthesis image by synthesizing images photographed by the plurality of registration cameras, and displays the distance information with respect to the obstacle acquired by the depth camera in the synthesis image; and
   an image control unit that displays the synthesized synthesis image on a display device,
   wherein the image synthesis unit displays the distance information with respect to the obstacle by illustrating the obstacle in a plurality of preset colors for corresponding distances spaced apart from the vehicle in the synthesis image,
   wherein the image control unit detects that the obstacle has a distance spaced apart from the vehicle equal to or less than a preset distance in the synthesis image, and simultaneously displays the synthesis image and an enlarged image in which an area comprising the detected obstacle in the synthesis image is enlarged on the display device, and
   wherein, for each of the plurality of preset colors, the distance matching the color is displayed in a bar shape simultaneously with the synthesis image and the enlarged image, and a degree of distance is sequentially arranged in the bar shape.

2. The surround view monitoring system according to claim 1, wherein the plurality of registration cameras comprises a first camera for photographing a front of the vehicle; a second camera for photographing a rear of the vehicle; a third camera for photographing a left side of the vehicle; and a fourth camera for photographing a right side of the vehicle.

3. The surround view monitoring system according to claim 1, wherein the depth camera senses a distance with respect to the obstacle existing around the vehicle by transmitting and receiving one or more infrared rays around the vehicle.

4. The surround view monitoring system according to claim 1, wherein the depth camera is provided in plurality, and each depth camera acquires the distance information with respect to the obstacle located in front, rear and both sides of the vehicle.

5. The surround view monitoring system according to claim 4, wherein the plurality of the depth cameras is disposed to be spaced apart in left and right directions at a front end and a rear end of the vehicle, or a plurality of the depth cameras is disposed to be spaced apart in front and rear directions at side ends of the vehicle.

6. The surround view monitoring system according to claim 1, wherein when a plurality of obstacles having a distance spaced apart from the vehicle equal to or less than the preset distance is detected in the synthesis image, the image control unit divides and displays a plurality of enlarged images each comprising one of the plurality of obstacles on the display device.

7. The surround view monitoring system according to claim 1, wherein the image control unit detects that the obstacle is positioned from the vehicle at a distance equal to or less than a preset distance in the synthesis image, and simultaneously displays an image comprising an adjacent obstacle among images photographed by the plurality of registration cameras and the synthesis image on the display device.

8. The surround view monitoring system according to claim 1, wherein the image control unit detects an obstacle having the shortest distance spaced apart from the vehicle in the synthesis image, and simultaneously displays an enlarged image in which an area comprising the detected obstacle is enlarged and the synthesis image on the display device.

9. A method for providing a surround view comprising the steps of:
   photographing different areas around a vehicle with a plurality of registration cameras, respectively;
   acquiring distance information, via a depth camera, with respect to an obstacle existing around the vehicle;
   generating a synthesis image by synthesizing images photographed by the plurality of registration cameras, and displaying the distance information with respect to the obstacle acquired by the depth camera in the synthesis image;
   detecting an obstacle having a distance spaced apart from the vehicle equal to or less than a preset distance in the synthesis image; and
   displaying the synthesized synthesis image on a display device,
   wherein in the step of generating the synthesis image and displaying the distance information, the distance information with respect to the obstacle is displayed by illustrating the obstacle in a plurality of preset colors for corresponding distances spaced apart from the vehicle in the synthesis image,
   wherein in the step of displaying the synthesis image on the display device, an enlarged image in which an area comprising the obstacle detected in the synthesis image is enlarged and the synthesis image and the enlarged obstacle are simultaneously displayed on the display device, and wherein, for each of the plurality of preset colors, the distance matching the color is displayed in a bar shape simultaneously with the synthesis image and the enlarged image, and a degree of distance is sequentially arranged in the bar shape.

10. The method for providing a surround view according to claim 9, wherein in the step of acquiring the distance information with respect to the obstacle, the distance with respect to the obstacle existing around the vehicle is sensed by transmitting and receiving one or more infrared rays around the vehicle.

11. The method for providing a surround view according to claim 9, wherein in the step of displaying the synthesis image on the display device, when in the step of detecting the obstacle, a plurality of obstacles having the distance spaced apart from the vehicle equal to or less than the preset distance is detected in the synthesis image, a plurality of the enlarged images each comprising the detected obstacle is divided and displayed on the display device.

12. The method for providing a surround view according to claim 9,
wherein in the step of displaying the synthesis image on the display device, an image comprising an adjacent obstacle among images photographed by the plurality of registration cameras and the synthesis image are simultaneously displayed on the display device.

13. The method for providing a surround view according to claim 9, further comprising, before the step of displaying the synthesis image on the display device, the step of detecting an obstacle having the shortest distance spaced apart from the vehicle in the synthesis image,
wherein in the step of displaying the synthesis image on the display device, an enlarged image in which an area comprising the detected obstacle in the synthesis image is enlarged and the synthesis image and the enlarged obstacle are simultaneously displayed on the display device.

* * * * *